US005775638A

United States Patent [19]

Duesler

[11] Patent Number: 5,775,638
[45] Date of Patent: Jul. 7, 1998

[54] MOUNTING ARRANGEMENT FOR A GAS TURBINE ENGINE

[75] Inventor: Paul W. Duesler, Manchester, Conn.

[73] Assignee: United Technologies Corporation, Hartford, Conn.

[21] Appl. No.: 742,525

[22] Filed: Nov. 1, 1996

Related U.S. Application Data

[63] Continuation of Ser. No. 362,719, Dec. 23, 1994, abandoned.

[51] Int. Cl.⁶ .................. B64D 27/26; F16M 1/00
[52] U.S. Cl. .................. 244/54; 248/555; 248/556; 248/557
[58] Field of Search .............. 244/53, 54; 248/554, 248/555, 556, 557; 60/39.31

[56] References Cited

U.S. PATENT DOCUMENTS

| | | | |
|---|---|---|---|
| 3,003,718 | 10/1961 | Peterson | 244/54 |
| 4,326,682 | 4/1982 | Nightingale | 244/54 |
| 4,458,863 | 7/1984 | Smith | 244/54 |
| 4,560,122 | 12/1985 | Parkinson et al. | 248/554 |
| 4,717,094 | 1/1988 | Chee | 244/54 |
| 5,078,342 | 1/1992 | Langley et al. | 244/54 |
| 5,181,675 | 1/1993 | Lardellier et al. | 244/54 |
| 5,197,692 | 3/1993 | Jones et al. | 244/54 |
| 5,227,382 | 7/1993 | Seelen et al. | 244/54 |
| 5,320,307 | 6/1994 | Spofford et al. | 244/54 |

FOREIGN PATENT DOCUMENTS

| | | | |
|---|---|---|---|
| 745343 | 5/1943 | Germany | 248/557 |
| 406067 | 10/1943 | Italy | 244/54 |

Primary Examiner—Virna Lissi Mojica
Attorney, Agent, or Firm—Marina F. Cunningham

[57] ABSTRACT

A linkage arrangement (20) joins a nacelle (12) enclosing a gas turbine engine (10) and a pylon (18) suspended from an aircraft wing. The linkage arrangement (20) counteracts the deflections of the nacelle (12) with respect to the free air stream due to the aerodynamic load. The linkage arrangement (20) includes a plurality of links (22, 24, 32, 34) that substantially duplicate the motion of a four bar linkage mechanism.

21 Claims, 9 Drawing Sheets

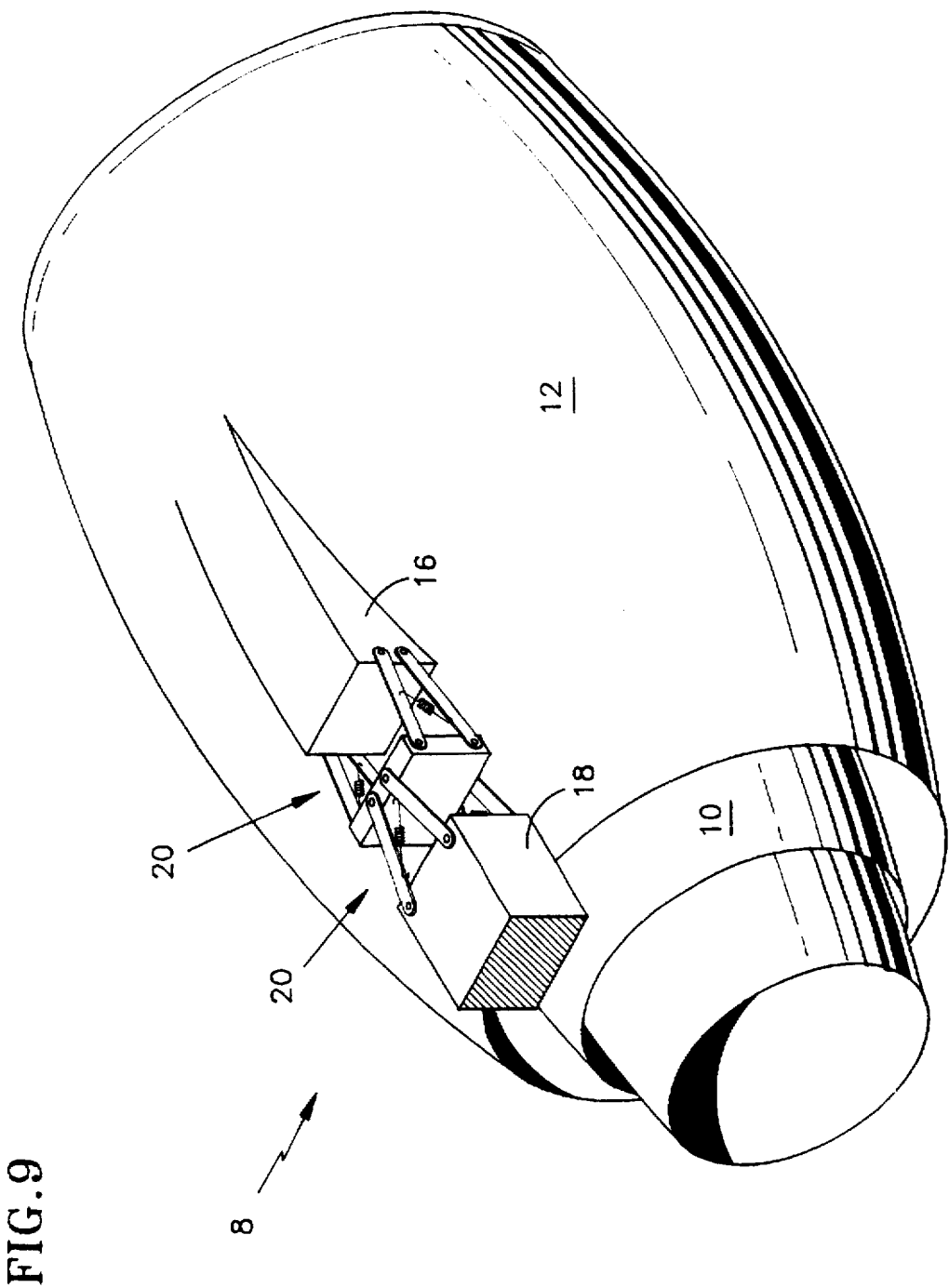

5,775,638

MOUNTING ARRANGEMENT FOR A GAS TURBINE ENGINE

This is a Continuation of application Ser. No. 08/362,719, filed on Dec. 23, 1994 now abandoned.

TECHNICAL FIELD

This invention relates to gas turbine engines and, more particularly, to mounting arrangements therefor.

BACKGROUND OF THE INVENTION

A typical gas turbine engine used to propel an airplane is encased in a nacelle. A pylon secures the nacelle onto the airplane. The newer generations of gas turbine engines tend to have larger diameter nacelles that accommodate larger diameter fans.

One of the drawbacks of the newer engines is that larger diameter nacelles experience greater aerodynamic load. Increased aerodynamic loads result in greater deflection of the pylon and greater angular deviation of the nacelle in pitch and yaw. The deflected position of the nacelle results in redistribution of the aerodynamic loads so that deflection increases even further, which in turn amplifies the aerodynamic loads. One problem caused by the angular deviation of the nacelle is that the center line of the nacelle becomes misaligned with the free air stream entering the nacelle. Such misalignment results in a momentum reaction force that acts on the nacelle and contributes to even greater deflection of the nacelle. Thus, both the aerodynamic load and the momentum force, caused by the aerodynamic load, contribute to the total angular deviation of the nacelle. Eventually, the elasticity of the pylon swings the nacelle to the other side like a pendulum and the cycle begins again. This pendulum effect can produce oscillations of the airplane wing, known as flutter. Severe oscillations or flutter may cause failure of the airplane wing.

One solution for reducing the deflection of the nacelle and wing flutter is to add significant weight for stiffening the aircraft wing. However, as is well known in the art, additional weight is highly undesirable in gas turbine engines and airplanes. Thus, the wing flutter problem presents a limitation to newer engines having larger diameter nacelles and fans.

DISCLOSURE OF THE INVENTION

According to the present invention, a linkage arrangement between a nacelle, enclosing a gas turbine engine, and a pylon, attaching the nacelle and the gas turbine engine onto an aircraft wing, steers the nacelle with respect to the pylon to counteract deflections of the pylon and deviations of the nacelle due to aerodynamic load. The linkage arrangement induces the nacelle to pivot about an instant center of rotation which is disposed forward of the point of application of the net aerodynamic load. The steering motion with respect to the pylon is achieved by having the linkage mechanism. A biasing means such as plurality of springs returns the nacelle to its original central position. Depending on the specific application, the linkage arrangement of the present invention can be tailored by selection of the biasing force to either mitigate the deflection of the pylon, eliminate the deviation, or overcompensate for the deflection.

One advantage of the present invention is that the linkage arrangement does not add significant weight to the aircraft. Another advantage of the present invention is that steering achieved by a passive device that does not require complicated active control mechanisms that would result in expensive hardware and software, require additional weight, and add a higher risk of failure.

The foregoing and other objects and advantages of the present invention become more apparent in light of the following detailed description of the exemplary embodiments thereof, as illustrated in the accompanying drawings.

BRIEF DESCRIPTION OF THE DRAWINGS

FIG. 9 is a simplified, schematic, representation of the linkage arrangement of FIG. 1 with two arrangements placed in a series, according to the present invention.

BEST MODE FOR CARRYING OUT THE INVENTION

Figure 1:
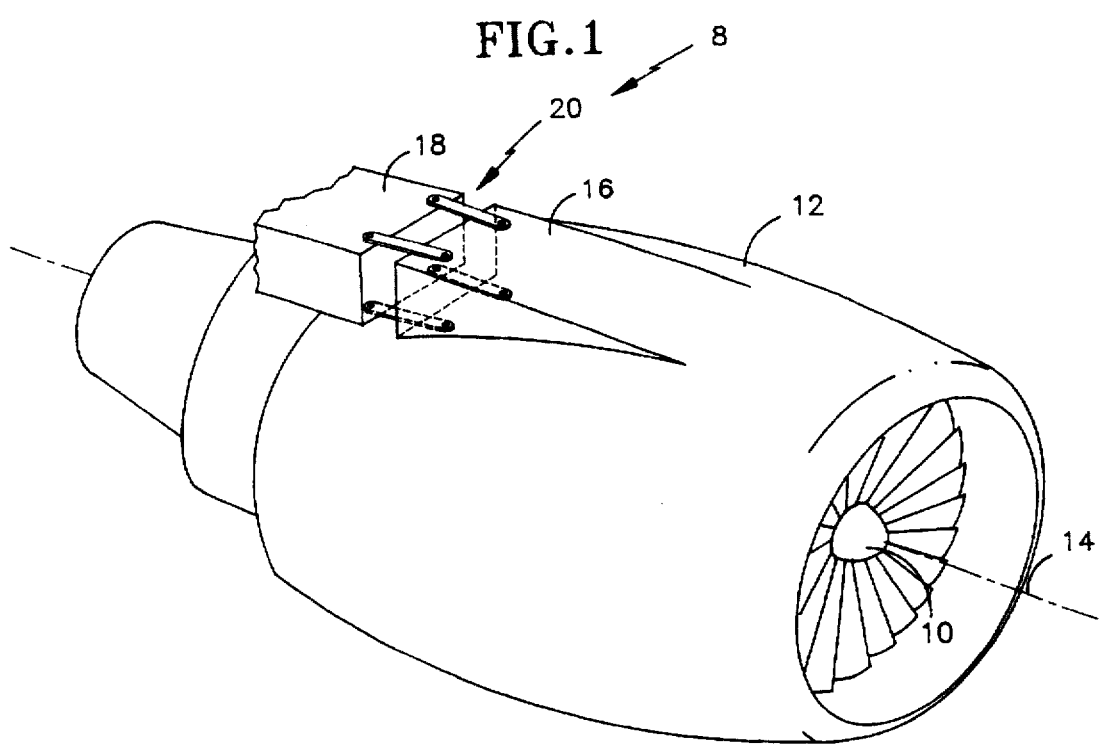
FIG. 1 is a simplified, schematic representation of an assembly including a gas turbine engine enclosed in a nacelle with the nacelle being attached onto a pylon by means of a linkage arrangement, according to the present invention.

Referring to FIG. 1, an assembly 8 includes a gas turbine engine 10 enclosed in a nacelle 12. Both the gas turbine engine 10 and the nacelle 12 are centered about a longitudinal center axis 14. A nacelle structure 16 is fixedly attached to the nacelle 12. A pylon 18, suspended from an aircraft wing (not shown), secures the nacelle 12 with the gas turbine engine 10 onto the aircraft wing. An attachment between the pylon 18 and the nacelle structure 16 is facilitated by a linkage arrangement 20.

Figure 2:
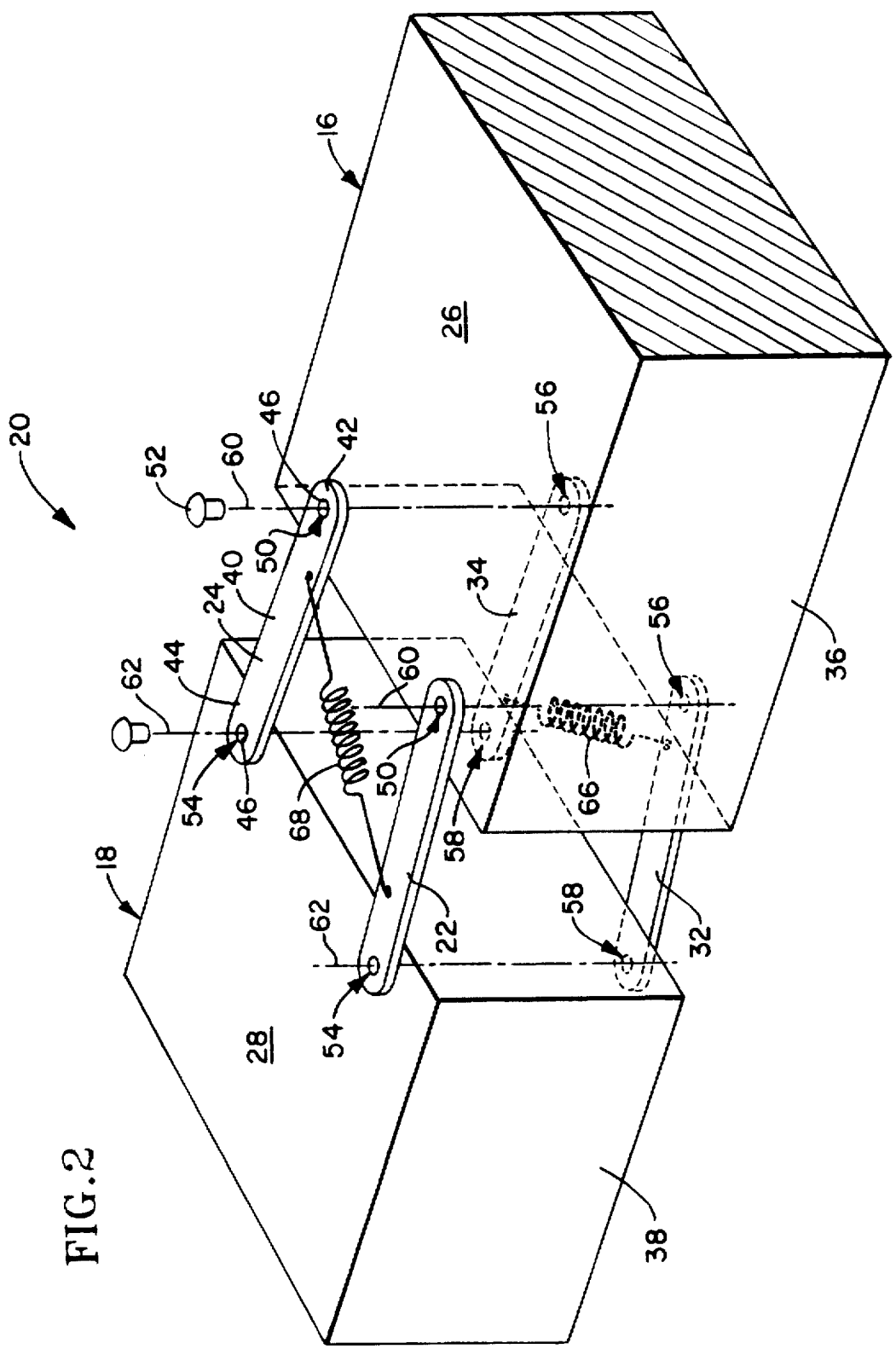
FIG. 2 is an enlarged, simplified, schematic representation of the linkage arrangement of FIG. 1.

The linkage arrangement 20, shown in greater detail in FIG. 2, includes two rigid upper links 22, 24 joining an upper nacelle structure surface 26 of the nacelle structure 16 and an upper pylon surface 28 of the pylon 18. Two rigid lower links 32, 34 join a lower nacelle structure surface 36 and a lower pylon surface 38. Each rigid link 22, 24, 32, 34 includes a link body 40 and a forward end 42 and an aft end 44. Each forward 42 end and each aft end 44 has a hole 46 formed therein. Each forward end 42 of each upper link 22, 24 attaches onto the upper nacelle structure surface 26 at a nacelle upper attachment point 50 by means of a pin 52 passing through the hole 46, so that each upper link 22, 24 is free to pivot about the nacelle upper attachment point 50. Similarly, each aft end 44 of each upper link 22, 34 attaches onto the upper pylon surface 28 at a pylon upper attachment point 54 by means of the pins 52 passing through the holes 46, so that each upper link 22, 24 is free to pivot about the pylon upper attachment point 54. Analogously, each forward and aft end of the lower links 32, 34 attaches to the lower nacelle structure surface 36 and to the lower pylon surface 38, respectively, at nacelle lower attachment points 56 and at pylon lower attachment points 58, respectively. Each lower link 32, 34 is free to pivot about the nacelle lower attachment point 56 and the pylon lower attachment point 58.

The upper links 22, 24 and the lower links 32, 34 are in register with each other, respectively. Consequently, the nacelle upper attachment points 50 are in register with the nacelle lower attachment points 56. The pylon upper attachment points 54 are in register with the pylon lower attachment points 58.

Each nacelle attachment line 60 passes through the nacelle upper attachment point 50 of the upper links 22, 24 and the nacelle lower attachment point 56 of the lower links 32, 34. Similarly, each pylon attachment line 62 passes through the upper and lower pylon attachment points 54, 58 of the upper and lower links 22, 24, 32, 34, respectively.

The distance between the two nacelle attachment lines 60 is shorter than the distance between the two pylon attachment lines 62.

A first spring 66, having two ends, attaches on to the lower and upper links 22, 34. A second spring 68, having two ends, attaches on to the lower and upper links 24, 32. The first spring 66 and the second spring 68 are oriented in opposite directions with respect to each other. These biasing means operate to urge the linkage to its neutral, or center position.

Figure 3:
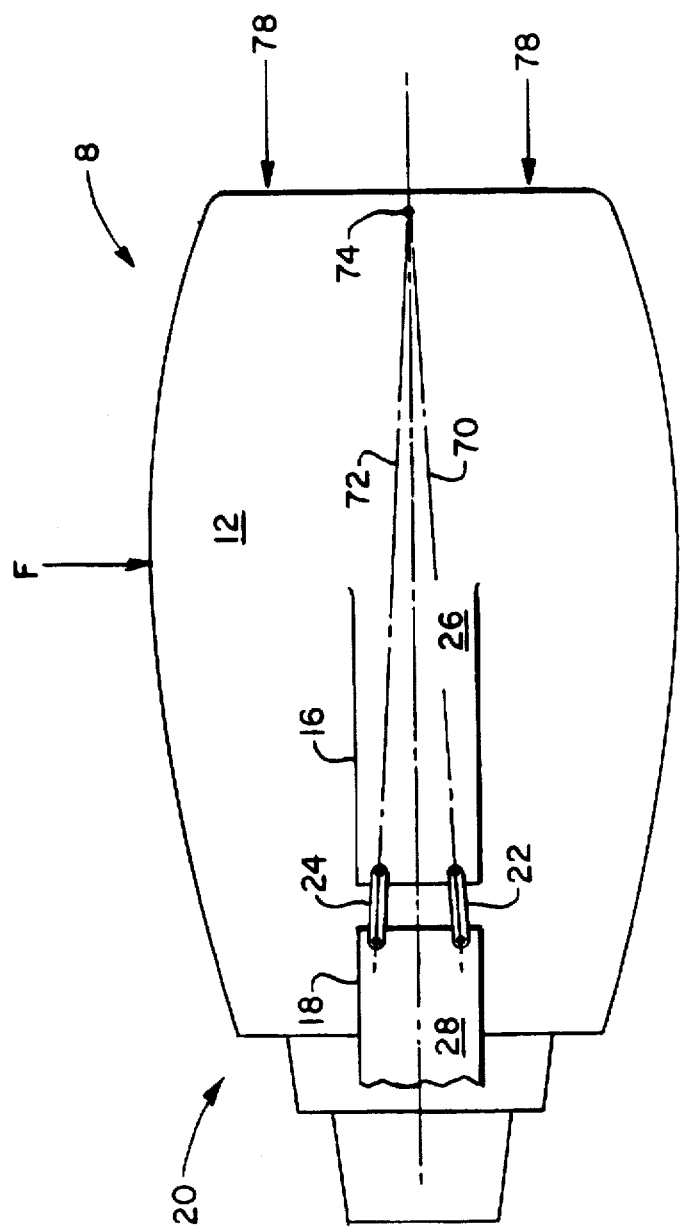
FIG. 3 is a simplified, schematic representation of the nacelle mounted on the pylon by means of the linkage arrangement of FIG. 2.

Links 22, 32 have a local center line 70 and links 24, 34 have a local center line 72 that are depicted by dashed lines in FIG. 3. The local center lines 70, 72 of the upper rigid links 22, 24 pass through the attachment lines 60, 62 and are extended forward the intersect at an instant center of rotation 74. The rigid links 22, 24 are arranged so that the instant center of rotation 74 is disposed upstream from a point of application of the net aerodynamic load F.

During operation of the gas turbine engine 10, air 78 enters the nacelle 12 in a substantially parallel relationship to the center axis 14 of the nacelle 12 and the gas turbine engine 10. During flight, a lateral aerodynamic load F, shown in FIG. 3, acts upon the nacelle 12. The aerodynamic load F tends to deflect pylon 18 and the nacelle 12. As the nacelle deviates from its original position, the linkage arrangement 20 steers the nacelle 12 to counteract the angular deviation. Depending on the specific needs of the airplane, the linkage arrangement 20 of the present invention has the flexibility to either eliminate the deflection of the center axis 14 of the nacelle from the direction of the free air stream 78, mitigate such deflection, or overcompensate for such deflection. The flexibility can be controlled by changing.

Figure 4:
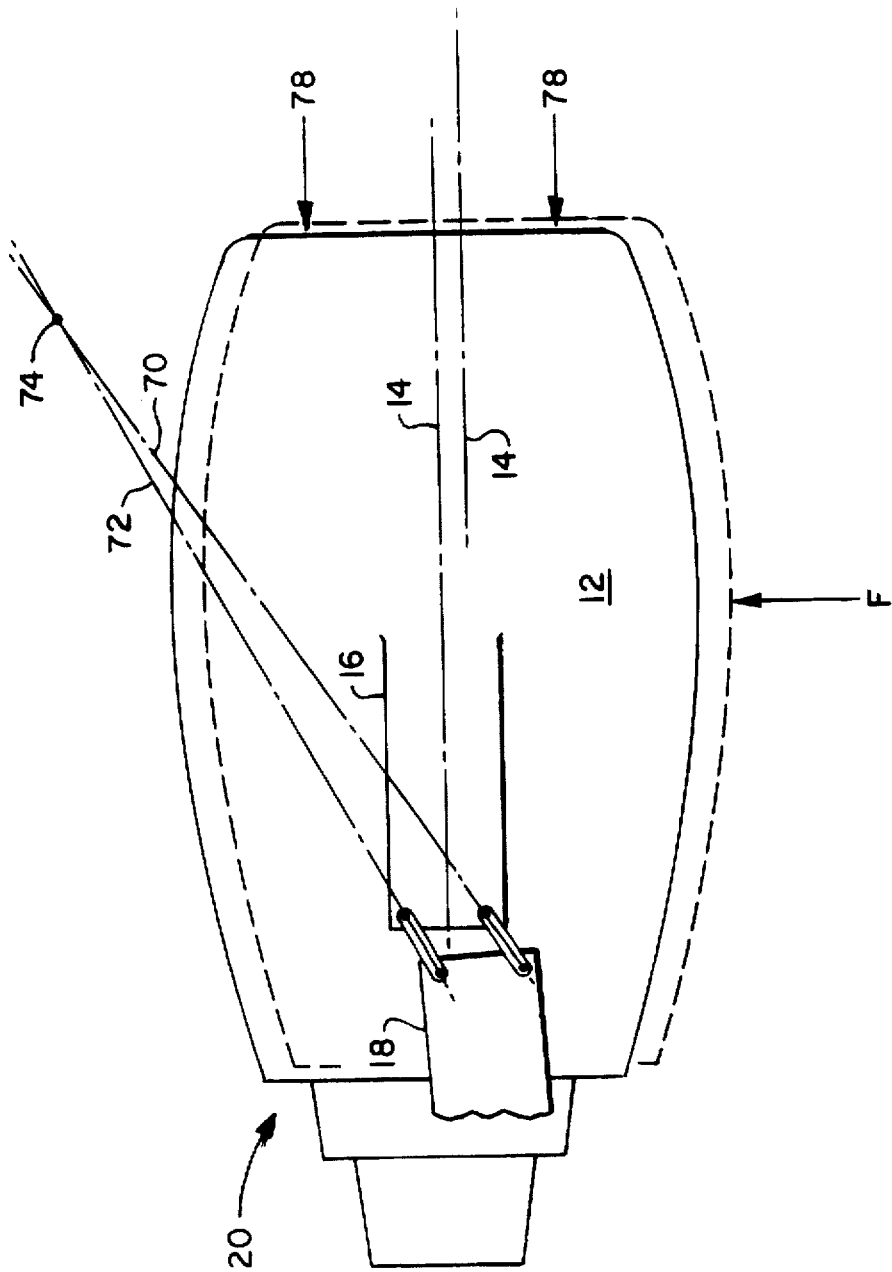
FIG. 4 is a simplified, schematic representation of the nacelle mounted on the pylon by means of the linkage arrangement of FIG. 3 with the linkage arrangement eliminating the deviation of the nacelle.
Figure 5:
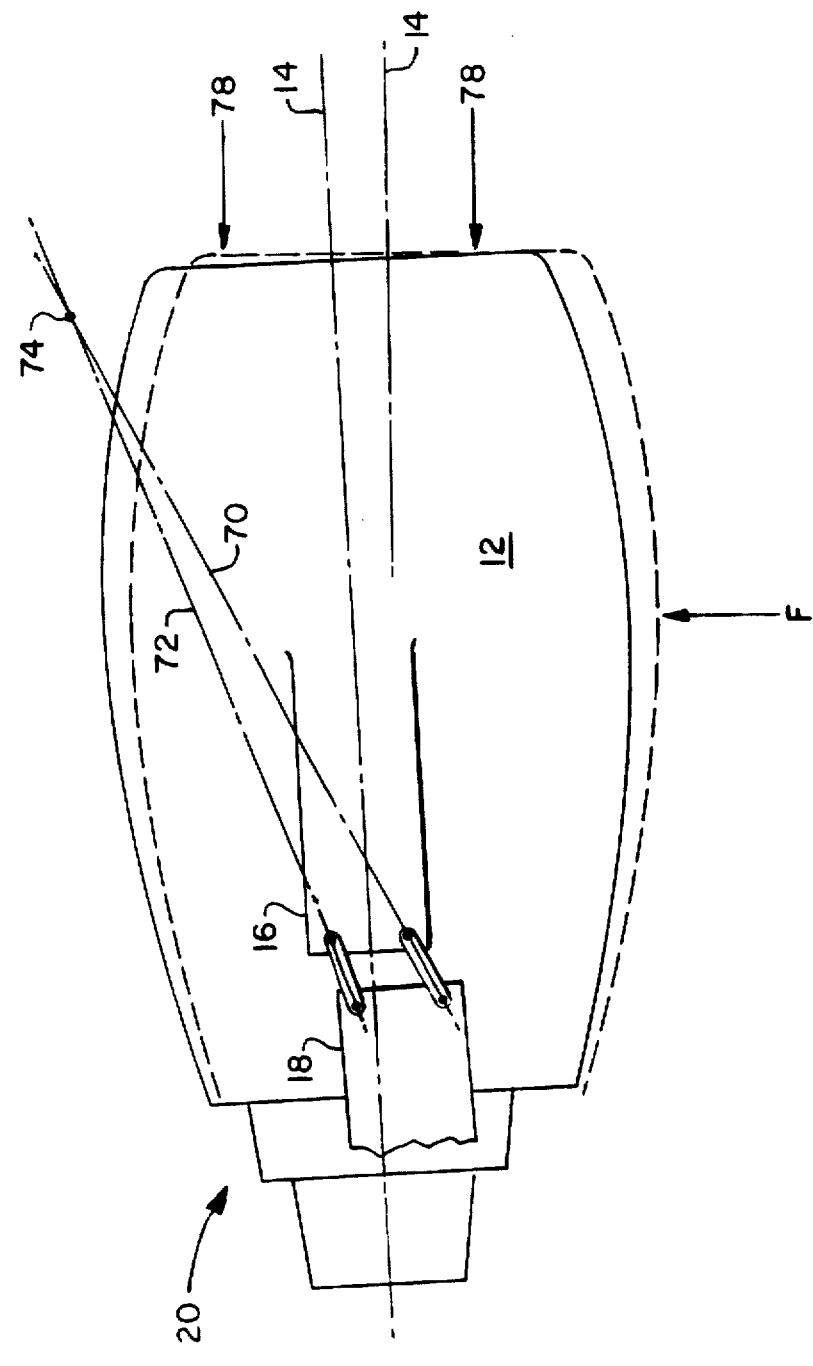
FIG. 5 is a simplified, schematic representation of the nacelle mounted on the pylon by means of the linkage arrangement of FIG. 3 with the linkage arrangement mitigating the deviation of the nacelle.
Figure 6:
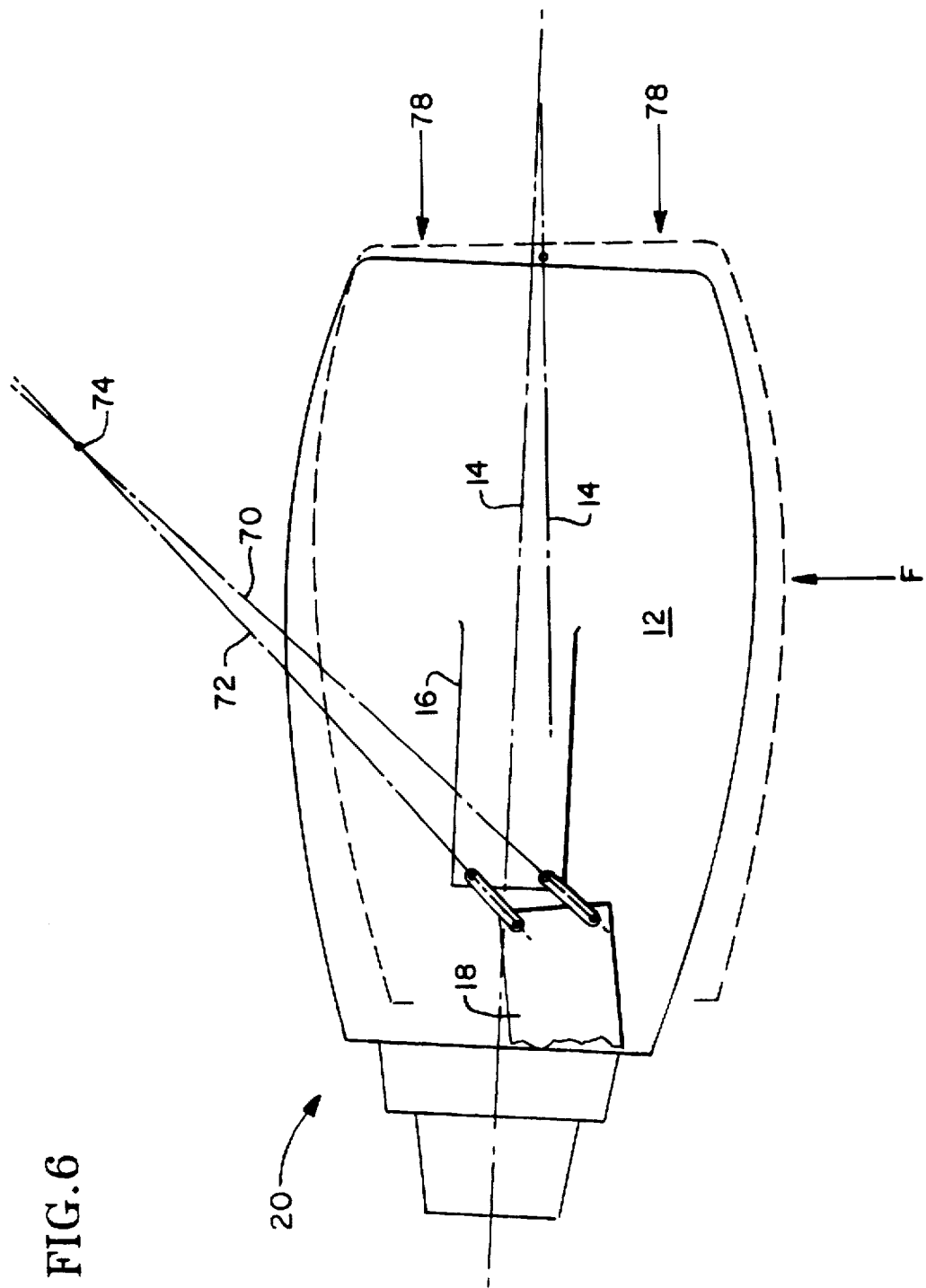
FIG. 6 is a simplified, schematic representation of the nacelle mounted on the pylon by means of the linkage arrangement of FIG. 3 with the linkage arrangement overcompensating for the deviation of the nacelle.

The elimination of the deviation, shown in FIG. 4, allows the center axis 14 of the deviated nacelle 12 to remain in a substantially parallel position to the direction of the free air stream 78. The mitigation of the angular deviation, shown in FIG. 5, allows for some correction of the deflection and can be accomplished by a weaker biasing means. The overcompensation of the deviation, shown in FIG. 6, results in the gas turbine engine "nosing" into the opposite direction of the deflection.

The linkage arrangement 20, reacting to applied aerodynamic load, exhibits the properties of a four bar linkage, with the pylon 18 acting as a frame, links 22, 24, 32, 34 acting as side links, and the nacelle structure 16 acting as a coupler. The motion of the four bar linkage is well known in the art. With the same length connecting links between spaced pins on opposing members, the angular positioning with translating movement varies, depending on the pin spacing in each member. As the links 22, 24, 32, 34 pivot about the nacelle and pylon attachment lines 60, 62, in response to continuously changing aerodynamic load F, the angular relationship between the pylon and the nacelle changes. The local center lines 70, 72 of the links also continuously change their respective positions. As the local center lines 70, 72 change their positions, the instant center of rotation 74 also changes its location, as shown in FIGS. 3–6. The nacelle 12 with the gas turbine engine 10 effectively pivots about the instant center of rotation 74. For the mounting arrangement of the present invention to operate properly, the instant center of rotation 74 must be disposed forward of the application point of the net aerodynamic load F.

The first and second springs 66, 68 provide a certain stiffness to the four bar linkage, as shown in FIG. 2. The springs enable the linkage arrangement 20 to return the nacelle 12 toward its original position. Although springs 66, 68 are shown as coil springs, other types of springs or stiffening links can be used. For example, a plurality of belleville washers in compression placed in a tube can be used.

The linkage arrangement of the present invention is a passive, self-correcting, structural control system. The linkage arrangement continuously counteracts the deviation of the nacelle in response to different magnitudes of the aerodynamic load. The springs return the nacelle toward the original or neutral position. One advantage of the present invention is that the linkage does not add significant weight to the aircraft. Another advantage is that the linkage arrangement of the present invention does not require expensive hardware and software to control the deflections of the nacelle.

Figure 7:
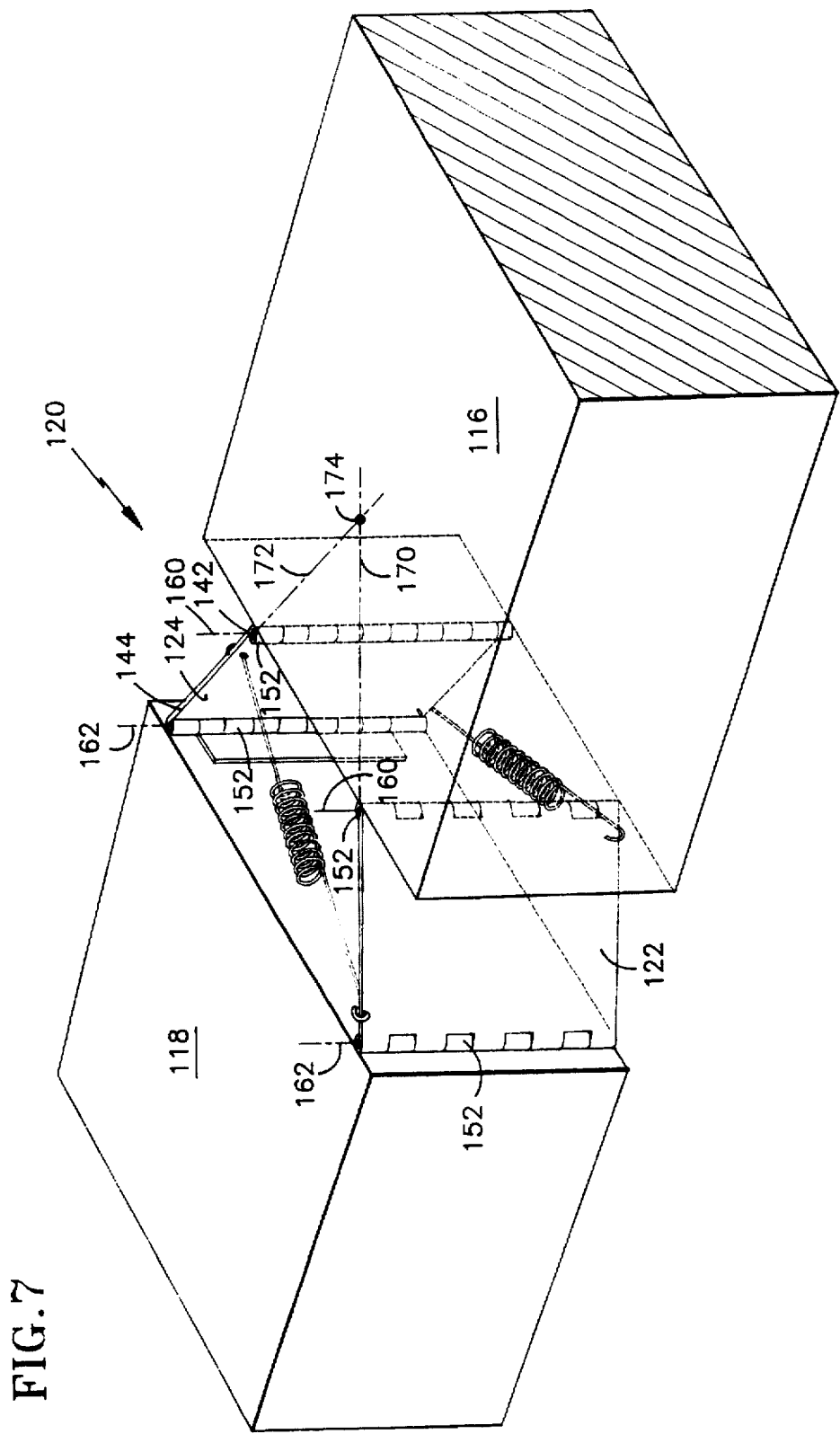
FIG. 7 is a simplified, schematic, representation of another embodiment of the linkage arrangement, according to the present invention.

Another embodiment of the present invention is shown in FIG. 7. The upper link 22 the lower link 32 are replaced by a first plate 122 and the upper link 24 and the lower link 34 are replaced by a second plate 124. The first plate and the second plate of this embodiment have a major dimension parallel to the hinge an act as side links of a four bar linkage mechanism. Each plate 122, 124 includes a forward end 142 and an aft end 144. The forward ends 142 of each plate 122, 124 are hingeably attached to the nacelle structure 116 so that nacelle attachment lines 160 pass through the hinges 152 attaching the plates 122, 124 to the nacelle structure 116. The aft ends 144 of each plate 122, 124 are hingeably attached to the pylon 118 so that pylon attachment lines 162 pass through the hinges 152 attaching the plates 122, 124 to the pylon 118.

The distance between the nacelle attachment lines 160 is shorter than the distance between the pylon attachment lines 162. Extension lines 170, 172 of each plate 122, 124, respectively, extended forward, intersect at an instant center of rotation 174. The instant center of rotation is disposed forward of the application point of the net aerodynamic load. The length of both plates 122, 124 is substantially the same. The strength of the biasing means or spring is tailored to the particular application and can be chosen such the linkage arrangement 120 can either mitigate deflection of the nacelle, eliminate the deflection, or overcompensate for the deflection.

Figure 8:
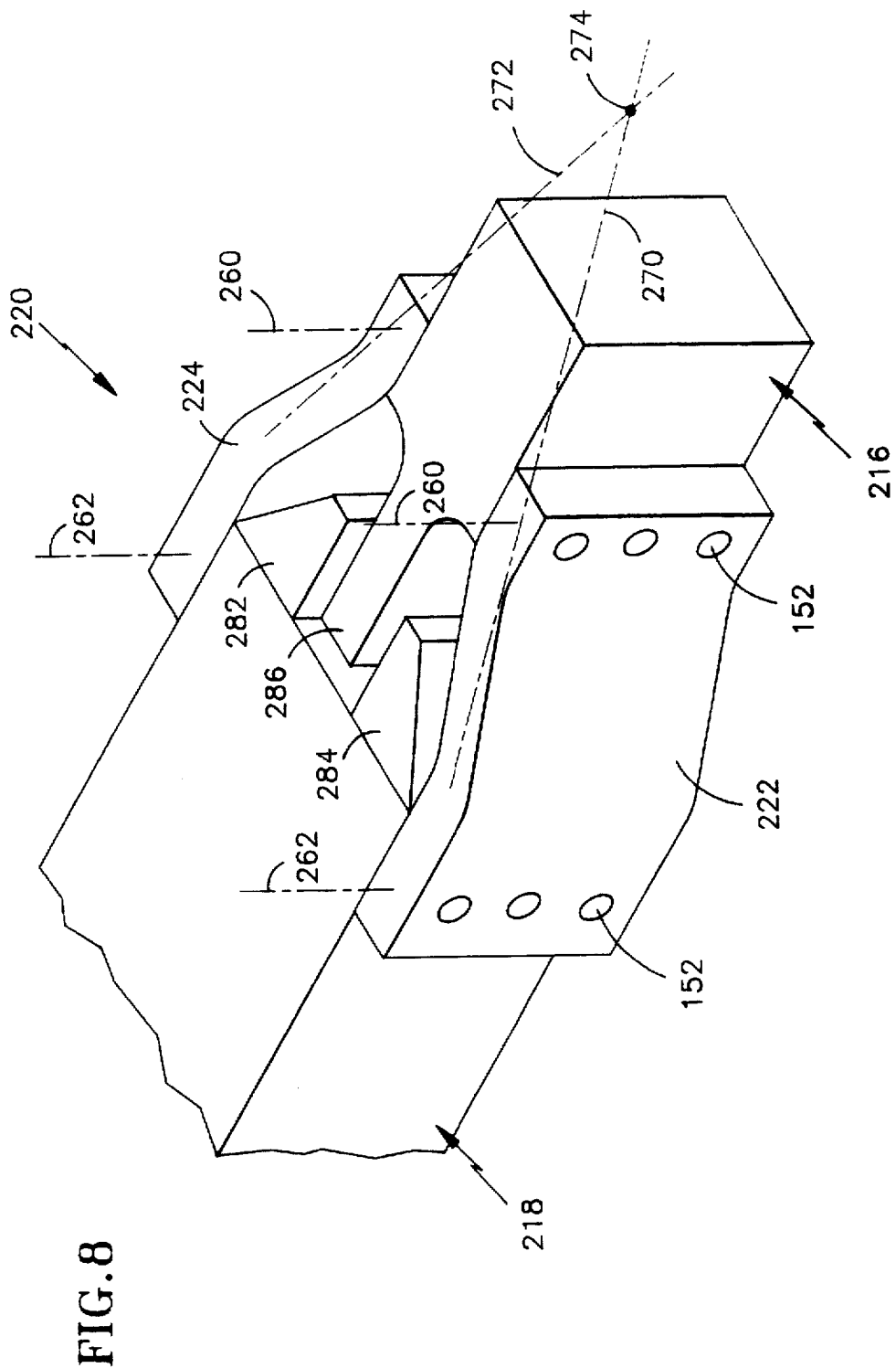
FIG. 8 is a simplified, schematic, representation of a further embodiment of the linkage arrangement, according to the present invention.

Another embodiment of the present invention is shown in FIG. 8. The linkage arrangement 220 includes two plates 222, 224 that attach to the nacelle structure 216 and to the pylon 218 by means of a plurality of "living" hinges 152. These resilient hinges are both hinges and biasing means. The distance between the nacelle attachment lines 260 is shorter than the distance between the pylon attachment lines 262. Extension lines 270, 271 of each plate 222, 224, extended forward, intersect at an instant center of rotation 274. The instant center of rotation 274 is disposed forward of the net application of the aerodynamic load F. The plates can be manufactured from a material such as spring steel to allow for flexibility thereof.

The linkage arrangement 220 includes as motion restricting mechanism 280 that comprises a first bumper 282, a second bumper 284, and a snout 286. The first and second bumpers 282, 284 protrude from the pylon 218. The snout 286 protrudes from the nacelle structure 216 and fits between the first and second bumpers 282, 284. A predetermined spacing is provided between the snout 286 and the bumpers 282, 284. As the nacelle 212 is deflected, the plates 222, 224 steer the nacelle in the direction opposite to the deflection. Once the maximum amount of desired travel is achieved, the snout bumps against one of the bumpers and thereby restricts any additional travel of the nacelle structure 216.

All embodiments of the present invention, as shown in FIGS. 2, 7, can include bumpers to restrict travel of the linkage arrangements. For example, a rubber bumper can be placed in either embodiment so that the links 22, 24, 32, 34 or plates 122, 124 bump into the bumpers preventing further displacement. Other motion restricting devices can be substituted to limit the travel of the four bar linkage.

The linkage arrangements 20, 120, 220 shown in the FIGS. 2, 7, 8 counteract the angular deviations of the nacelle 12 in the yaw direction. To counteract deviation of the nacelle in the yaw and pitch directions, the linkage arrangements can be placed in series, as shown in FIG. 9. The linkage arrangements are positioned 90° out of phase with respect to each. Two linkage arrangements placed in the series will counteract the deviations of the nacelle in every direction.

Although the invention has been shown and described with respect to exemplary embodiments thereof, it should be understood by those skilled in the art that various changes, omissions, and additions may be made thereto, without departing from the spirit and scope of the invention. For example, the term "link" contemplates any structure that functionally behaves as a side link of a typical four bar linkage mechanism.

I claim:

1. A mounting arrangement for a gas turbine engine on an aircraft including:

a gas turbine engine for powering said aircraft;

a nacelle enclosing said gas turbine engine; said nacelle having a net aerodynamic load acting on said nacelle in a direction perpendicular to the axis of said nacelle, a pylon suspended from said aircraft; and a support for securing said nacelle to said pylon comprising:

a four bar linkage arrangement having, a first pylon attachment point, a second pylon attachment point, a first nacelle attachment point, a second nacelle attachment point, a first link, connecting one of said pylon attachment points and one of said nacelle attachment points, a second link, connecting the other of said pylon attachment points and the other of said nacelle attachment points, the distance between said first and second nacelle attachment points being less than the distance between said first and second pylon attachment points, whereby an instant center of rotation is established by said first and second links and said instant center of rotation disposed forward of a point of application of said net aerodynamic load, thereby steering said nacelle to counteract angular deflection of said pylon and said nacelle due to said aerodynamic load acting thereon.

2. A mounting arrangement as in claim 1 further comprising:

at least one bumper located to limit travel of said linkage arrangement.

3. A mounting arrangement as in claim 1 further comprising:

said four bar linkage having a neutral position, and biasing means connected to urge said four bar linkage toward the neutral position of said four bar linkage.

4. A mounting arrangement as in claim 1 further comprising:

at least one bumper located to limit travel of said linkage arrangement.

5. A mounting arrangement as in claim 1 wherein:

each of said first and second links comprises an upper link and a lower link in registration with each other.

6. A mounting arrangement as in claim 1 further comprising:

each of said first and second links comprising a plate with a major dimension parallel to an axis through said attachment points.

7. A mounting arrangement as in claim 3 wherein at least one attachment of each of said first and second links is a resilient hinge, whereby said resilient hinge acts both as a hinge and a biasing means.

8. A mounting arrangement as in claim 7, wherein:

both attachment points for each of said first and second links is a resilient hinge.

9. A mounting arrangement as in claim 1 wherein said four bar linkage comprises a first four bar linkage, further comprising:

said nacelle including a second four bar linkage at 90 degrees from said first four bar linkage.

10. A mounting arrangement as in claim 3 further comprising:

at least one bumper located to limit travel of said linkage arrangement.

11. A mounting arrangement as in claim 10 further comprising:

each of said first and second links comprising a plate with a major dimension parallel to an axis through said attachment points.

12. A mounting arrangement as in claim 10 wherein at least one attachment of each of said first and second links is a resilient hinge, whereby said resilient hinge acts both as a hinge and a biasing means.

13. A mounting arrangement as in claim 12, wherein:

both attachment points for each of said first and second links is a resilient hinge.

14. A mounting arrangement as in claim 13 wherein said four bar linkage comprises a first four bar linkage, further comprising:

said nacelle including a second four bar linkage at 90 degrees from said first four bar linkage.

15. A mounting arrangement as in claim 4 wherein said four bar linkage comprises a first four bar linkage, further comprising:

said nacelle including a second four bar linkage at 90 degrees from said first four bar linkage.

16. A mounting arrangement as in claim 1 further comprising:

said four bar linkage having a neutral position, and biasing means connected to urge said four bar linkage toward the neutral position of said four bar linkage.

17. A mounting arrangement as in claim 16 further comprising:

at least one bumper located to limit travel of said linkage arrangement.

18. A mounting arrangement as in claim 17 further comprising:

each of said first and second links comprising a plate with a major dimension parallel to an axis through said attachment points.

19. A mounting arrangement as in claim 18 wherein at least one attachment of each of said first and second links is a resilient hinge, whereby said resilient hinge acts both as a hinge and a biasing means.

20. A mounting arrangement as in claim 2 further comprising:

each of said first and second links comprising a plate with a major dimension parallel to an axis through said attachment points.

21. A mounting arrangement as in claim 20 wherein at least one attachment of each of said first and second links is a resilient hinge, whereby said resilient hinge acts both as a hinge and a biasing means.

* * * * *